US008223344B1

(12) United States Patent
Kelley

(10) Patent No.: US 8,223,344 B1
(45) Date of Patent: Jul. 17, 2012

(54) POSITIONING DEVICES IN A RACK BASED ON OPTICAL SIGNALS

(75) Inventor: Keith L. Kelley, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 384 days.

(21) Appl. No.: 12/360,177

(22) Filed: Jan. 27, 2009

(51) Int. Cl.
*G01B 11/14* (2006.01)

(52) U.S. Cl. .................................. 356/614; 356/620

(58) Field of Classification Search .......... 356/614–623; 705/22, 28–29; 340/825, 10.1–10.3, 572.1, 340/572.4, 539.13, 539.11, 505, 5.92; 235/385, 235/462.13, 454, 376, 439, 441, 375, 435; 700/213, 229; 367/2, 6
See application file for complete search history.

(56) References Cited

U.S. PATENT DOCUMENTS

| 6,339,764 | B1 | 1/2002 | Livesay et al. |
| 6,762,691 | B2 | 7/2004 | Piazza |
| 6,796,506 | B1 | 9/2004 | Pradham |
| 2008/0272887 | A1 | 11/2008 | Brey et al. |

OTHER PUBLICATIONS

"HP Integrated Lights-Out", http://en.wikipedia.org/wiki/HP_Integrated_Lights-Out, pp. 1-2, Nov. 3, 2008.
Ibach et al., "WLAN-Based Asset Tracking for Warehouse Management," IADIS International Conference e-Commerce, Porto, Portugal, pp. 1-8, Dec. 15-17, 2005.

*Primary Examiner* — Tri T Ton

(57) ABSTRACT

To position electronic devices in a rack, one of the electronic devices in the rack emits an optical signal. One of a plurality of optical receivers mounted to the rack receives the optical signal. An indication from the optical receiver is provided to specify that the optical receiver has received the first optical signal.

18 Claims, 4 Drawing Sheets

POSITIONING DEVICES IN A RACK BASED ON OPTICAL SIGNALS

BACKGROUND

Many enterprises employ data centers that include a relatively large number of computer servers or other types of electronic devices (e.g., storage devices, communications devices, etc.) mounted in racks. The electronic devices can be used for performing various tasks associated with the enterprise, such as to provide software applications, to perform data storage, to provide web-based services, to route data traffic in a network, and so forth.

The electronic devices mounted in racks of a data center are typically removably mounted, which means that the computer servers can be removed from respective racks for various reasons, such as to perform repairs, to perform component upgrades, and so forth. Often, after an electronic device has been removed from a particular bay of a rack, a different electronic device may be substituted in place of the removed electronic device. The removed electronic device can later be mounted in a different bay of the rack, or even in a different rack.

Some conventional techniques of identifying positions of electronic device mounted in racks involve manual identification, by personnel of the enterprise, of positions of the electronic devices. For example, a technician can visually determine positions of the electronic devices in a rack, and based on the visually identified positions, the technician can enter identification information into an asset management system. Such a manual process of positioning electronic devices in racks is error-prone and labor-intensive.

On the other hand, conventional automated techniques of positioning electronic devices in racks can be relatively complex and thus costly.

BRIEF DESCRIPTION OF THE DRAWINGS

Some embodiments of the invention are described with respect to the following figures.

DETAILED DESCRIPTION

Figure 1:
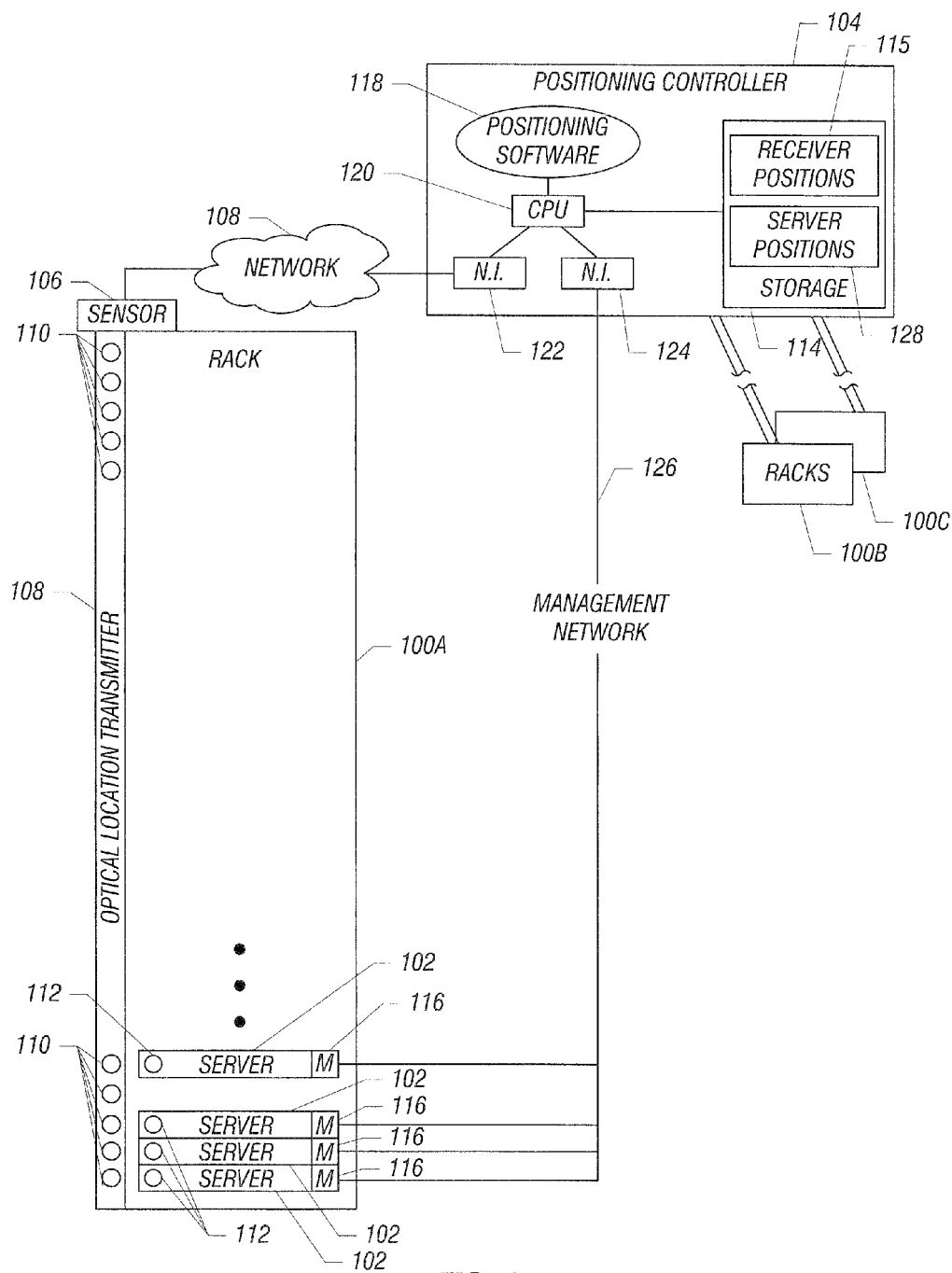
FIG. 1 is a block diagram of an exemplary data center that includes racks containing removably mounted computer servers and a positioning system in accordance with some embodiments.

FIG. 1 illustrates various racks 100A, 100B, 100C that can be part of an exemplary data center of an enterprise (e.g., company, educational organization, government agency, etc.). Note that the arrangement of FIG. 1 is provided as an example; in other implementations, other arrangements can be employed. A "data center" refers to any collection of electronic device resources to provide services associated with an enterprise, including execution of software applications, storage of data, provision of web-based services, provision of communications services, and so forth. As depicted in FIG. 1, the rack 100A includes computer servers 102 removably mounted in respective positions of the rack. The positions of the rack 100A can be in the form bays or other types of partitions. The other racks 100B and 100C also include computer servers 102 removably mounted in corresponding positions of the racks 100B and 100C. Although three racks 100A, 100B, 100C are depicted, note that in other implementations, other numbers of racks (one or greater) can be employed.

A removably mounted computer server 102 can be removed from the rack after it has been mounted in the rack, such as to perform repair, upgrade, or other tasks with respect to the removed computer server. Although reference is made to "computer servers" in the ensuing discussion, note that other types of electronic devices can also be mounted in each rack, such as storage devices, communications devices, and so forth. A "rack" refers to any containing structure that is capable of receiving multiple electronic devices.

In accordance with some embodiments of the invention, a positioning system is associated with the racks 100A, 100B, and 100C. The positioning system includes a positioning controller 104, which can be a computer, for example. The positioning system also includes an optical sensor 106, an optical location transmitter 108, and light sources 112, which are depicted as being part of the rack 100A. Note that the light sources 112 are part of servers 102 mounted in the rack 100A. Similar components can be associated with the other racks 100B and 100C.

The optical sensor 106 is connected to the positioning controller 104 over a network 108, which can be an Ethernet network, a Universal Serial Bus (USB) link, or other type of network. The optical sensor 106 sends data over the network 108 to the positioning controller 104, where the data contains representations of indications received from light sources 112 over the optical location transmitter 108.

The optical sensor 106 is optically connected to the optical location transmitter 108, which extends along the height of the rack 100A in the arrangement of FIG. 1. In alternative embodiments, the optical location transmitter 108 can have other arrangements with respect to the rack 100A. The optical location transmitter 108 can be a structure formed of an opaque material that defines multiple optical channels that are able to carry optical signals (light) from the light sources 112 to the optical sensor 106. The optical location transmitter 108 includes multiple optical ports 110 along the length of the optical location transmitter 108. The optical ports 110 are positioned adjacent respective servers 102 to receive light from the respective light sources 112. The optical signals received by the respective optical ports 110 are propagated along the optical channels of the optical location transmitter 108 to the optical sensor 106. Based on the optical signals received over the optical location transmitter 108 by the optical sensor 106, the optical sensor 106 is able to send corresponding data responsive to the received optical signals over the network 108 to the positioning controller 104 for processing.

In an alternative embodiment, instead of being positioned at the top of the rack 100A as shown in FIG. 1, the optical sensor 106 can be positioned somewhere, such as in the middle of the optical location transmitter 108.

In one embodiment, the light sources 112 can be light-emitting diodes (LEDs). In the ensuing discussion, reference is made to LEDs 112; however, in other embodiments, other types of light sources can be used. The LEDs 112 are referred to as "positioning LEDs," since they are used to determine positions of respective computer servers 102.

The optical ports 110 of the optical location transmitter 108 are arranged to be aligned with respective light sources 112 of the computer servers 102 when the computer servers 102 are mounted in the rack 100A. In some embodiments, the optical ports can be formed of openings in the opaque structure of the optical location transmitter 108; however, in alternative embodiments, the optical ports can be implemented with other forms of optical receivers, such as light detectors, lens assemblies, and so forth.

The positions of the optical ports 110 along the optical location transmitter 108 are known, and are stored as receiver positions represented as receiver position information 115 in a storage 114 of the positioning controller 104. The positions of the optical ports 110 can be expressed as Us, where a "U" represents a particular position along the rack 100A. Thus, for example, the optical ports 110 can be considered to be at positions U1, U2, U3, ... Un, where n represents the number of available positions of the rack 100A for receiving corresponding computer servers 102. The known position of each optical port 110, as recorded in receiver position information 115 in the storage 114 of the positioning controller 104, can be used to determine a respective position of the corresponding computer server 102 that has been mounted adjacent the optical port 110.

As further depicted in the example of FIG. 1, each of the computer servers 102 includes a management processor 116. The management processor 116 is used to perform various management tasks with respect to each computer server 102, where the management tasks include diagnostic tasks, power monitoring and regulation, and other management tasks. The management processor 116 of each computer server 102 is accessible by a remote management system to perform remote management of each computer server 102.

In accordance with some embodiments, the positioning controller 104 is able to also communicate with each of the management processors 116 in the respective computer servers 102. Note that in some implementations, the positioning controller 104 can be part of the remote management system referred to above.

The positioning controller 104 is able to send commands (over a management network or bus 126) to the management processors 116 in respective computer servers 102 to control activation respective positioning LEDs 112 of the computer servers 102. Note that the positioning LED 112 of each computer server 102 can be a pre-existing LED that already exists in the computer server 102 to provide other indications, such that no additional components would have to be added to each computer server 102 for the purpose enabling positioning of the computer server. Alternatively, the positioning LED 112 can be a new LED added to the computer server 102.

The positioning controller 104 is configured to sequentially activate the positioning LEDs 112 such that only one of the LEDs 112 is on at any given time. In this manner, the optical location transmitter 108 receives just a single optical signal from one LED 112 at any given time during a positioning procedure, such that collisions due to multiple LEDs 112 being on at the same time are avoided. The positioning controller 104 controls activation of each positioning LED 112 by sending an activation command to the respective management processor 116 of the computer server 102. In response to the activation command, the management processor 116 sends a control signal to the positioning LED 112 to turn on the positioning LED 112. The positioning controller 104 can also be configured to send a deactivation command to each management processor 116 to cause the management processor 116 to send a deactivation signal to the respective positioning LED 112 to turn off the positioning LED.

The positioning controller 104 includes positioning software 118 that is executable on one or more central processing units (CPUs) 120 to perform a positioning procedure according to some embodiments. A positioning procedure includes sequentially activating the positioning LEDs 112 of the computer servers 102, and receiving indications of detected optical signals from the optical sensor 106. Based on the received indications of detected optical signals, the positioning software 118 is able to determine the positions of corresponding computer servers 102.

The positioning controller 104 further includes a first network interface 122, which is connected over the network 108 to the optical sensor 106. The network interface 122 can be an Ethernet port, a USB port, and so forth. The positioning controller 104 also includes a second network interface 124 that is connected over the management network or bus 126 to the management processors 116 in respective computer servers 102. In an alternative embodiment, instead of two separate networks 108 and 126, a single network can be used to perform communications between the position controller 104 and the optical sensor 106 and management processors 116.

Positions of the computer servers 102 determined according to the position procedure according to some embodiments are represented as server positions in server position information 128 stored in the storage 114 of the positioning controller 104. The server position information 128 can be accessed either by a software application locally in the positioning controller 104, or by a remote system. For example, a system administrator or network administrator can use the server position information 128 to maintain an updated inventory of computer servers deployed in the data center, and where those computer servers are located.

Figure 2:
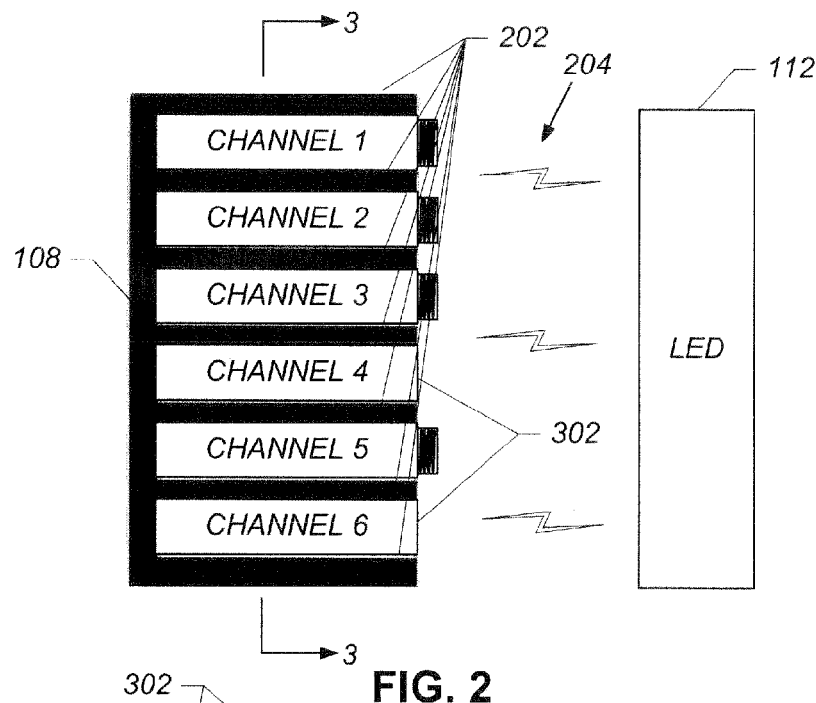
FIG. 2 is a top view of an opaque structure containing optical channels, wherein the opaque structure is part of a positioning system according to an embodiment.

FIG. 2 is a top view that looks downwardly on the optical location transmitter 108 such that the channels of the optical location transmitter 108 are depicted. The channels (channels 1-6) are defined by dividers 202 of the opaque structure that forms the optical location transmitter 108. (Although six channels are shown in this example, it is noted that other embodiments can use other numbers of channels that are greater than one). Each channel is defined between adjacent pairs of dividers 202. One of the positioning LEDs 112 of a respective computer server 102 is depicted as being adjacent the optical location transmitter 108. Light 204 from the positioning LED 112 is emitted towards the optical location transmitter 108.

Figure 3:
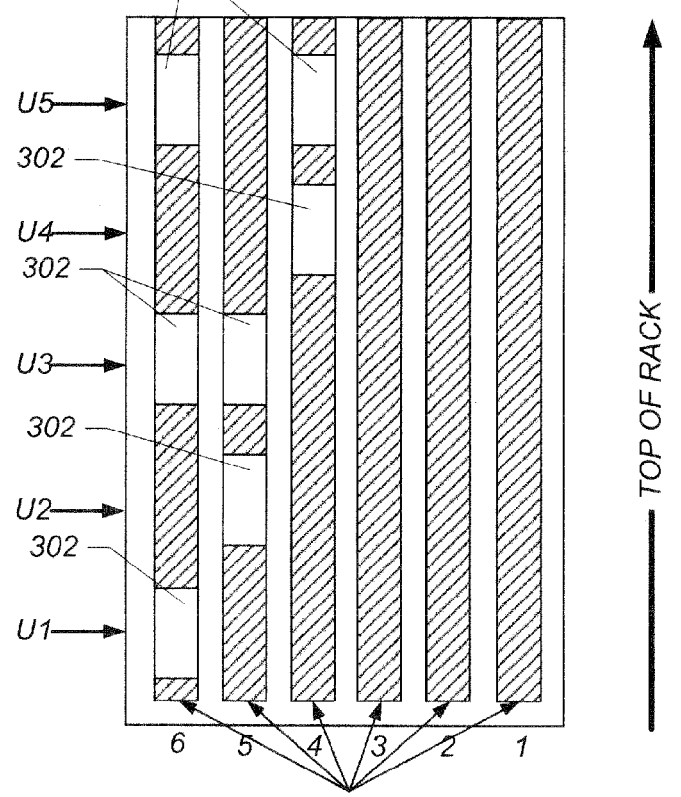
FIG. 3 illustrates a portion of an opaque structure having respective optical ports that are part of the positioning system according to an embodiment.

The section of the optical location transmitter 108 depicted in FIG. 2 can correspond to position U5 depicted in FIG. 3, which shows openings 302 formed in the opaque structure of the optical location transmitter 108 in front of channels 4 and 6. No openings are formed in front of channels 1-3 and 5, such that light emitted by the LED 112 cannot reach channels 1-3 and 5 at position U5. However, the openings 302 formed in the opaque structure of the optical location transmitter 108 allow light from the LED 112 to enter channels 4 and 6 at position U5. The light received in channels 4 and 6 is propagated along the length of the optical location transmitter from position U5 for receipt by the optical sensor 106. The arrangement of openings and no openings at position U5 is also depicted in FIG. 2.

The combination of the openings 302 and lack of openings for each respective position of the optical location transmitter 108 together form a respective optical port (110 in FIG. 1). The indication generated by each optical port in response to the light from a respective positioning LED 112 is a combination of binary values provided by the respective channels 1-6. At position U5, each of channels 1-3 and 5 provides a first binary value (indicating no light has been received), while each of channels 4 and 6 provides a second binary value (indicating light has been received). The six bits corresponding to channels 1-6 form a collective value that is received by the optical sensor 106. The optical sensor 106 converts the six bits into data for propagation to the positioning controller 104.

As further depicted in FIG. 3, the optical port at position U4 has an opening formed for channel 4 but no openings for channels 1-3, 5, and 6. At position U3, the optical port has openings formed for channels 5 and 6, but no openings for channels 1-4.

The six channels allow encoding of up to 64 locations in the rack. In other implementations, a different number of channels can be employed, depending upon the number of positions in the rack that are to be encoded.

The respective bits corresponding to the multiple channels received by the optical sensor 106 are converted by the optical sensor into a digital format for communication over the network 108 to the positioning controller 104.

In the FIG. 3 embodiment, the number of exposed openings at the different positions is variable. For example, positions U1, U2, and U4 in FIG. 3 each has just one exposed opening, whereas positions U3 and U5 each has two exposed openings. The embodiment of FIG. 3 relies upon the fact that the positioning controller 104 can reliably control activation of the positioning LEDs 112 such that no collisions would occur (in the form of two or more positioning LEDs 112 being on at the same time) during a positioning procedure.

In an alternative embodiment, to address the possibility that two or more LEDs 112 can be on at the same time, resulting in collision, a fixed number N (N>1), of exposed openings is defined at each position of the optical location transmitter 108. In the embodiment depicted in FIG. 4, for example, N is set equal to 4, such that each of the positions has exactly four exposed openings. The FIG. 4 embodiment uses eight channels in the optical location transmitter. Each optical port has a unique combination of exposed channels (provided by openings 402).

If the positioning controller 104 detects that more than N number of channels are illuminated, then that is an indication that a collision has occurred (more than one positioning LED is on at one time), and the positioning controller 104 can indicate an error condition.

Figure 4:
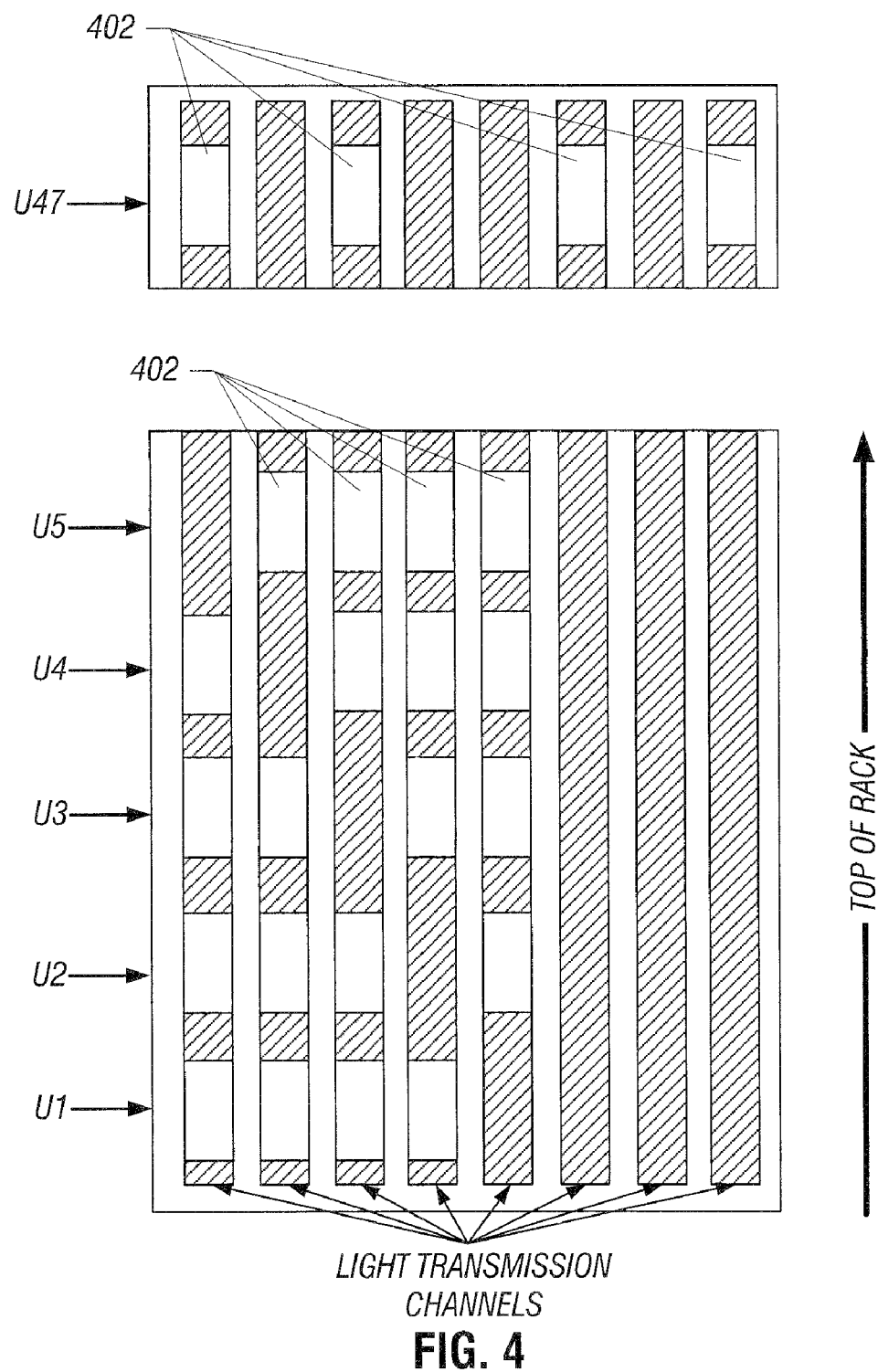
FIG. 4 illustrates a portion of an opaque structure containing respective optical ports, in accordance with another embodiment.

In the FIG. 4 embodiment, the number of channels in the optical location transmitter employed is a function of the number of unique locations to be reported, and the number of channels exposed at each optical port. The number of locations that can be encoded using C channels with E exposed channels at each optical port is:

$$C!/((C-E)!*E!).$$

In some examples, the number of channels exposed at each optical port can be three, four, or five. Four exposed channels for an 8-channel optical location transmitter would support encoding for 70 locations, as computed from the following:

$$8!/(8-4)!*4!)=40302/(24*24)=70.$$

Three or five channels on an eight-channel optical location transmitter would support 56 locations.

As yet another alternative, more positions can be encoded on a fewer number of channels by also including color at each port. For example, one port can have a red filter (to allow just red color light to pass through), another port can have a blue filter (to allow just blue color light to pass through), and a third port can have a green filter (to allow just green color light to pass through). The three different color filters used at different ports effectively provide additional encoding without having to increase the number of channels.

Figure 5:
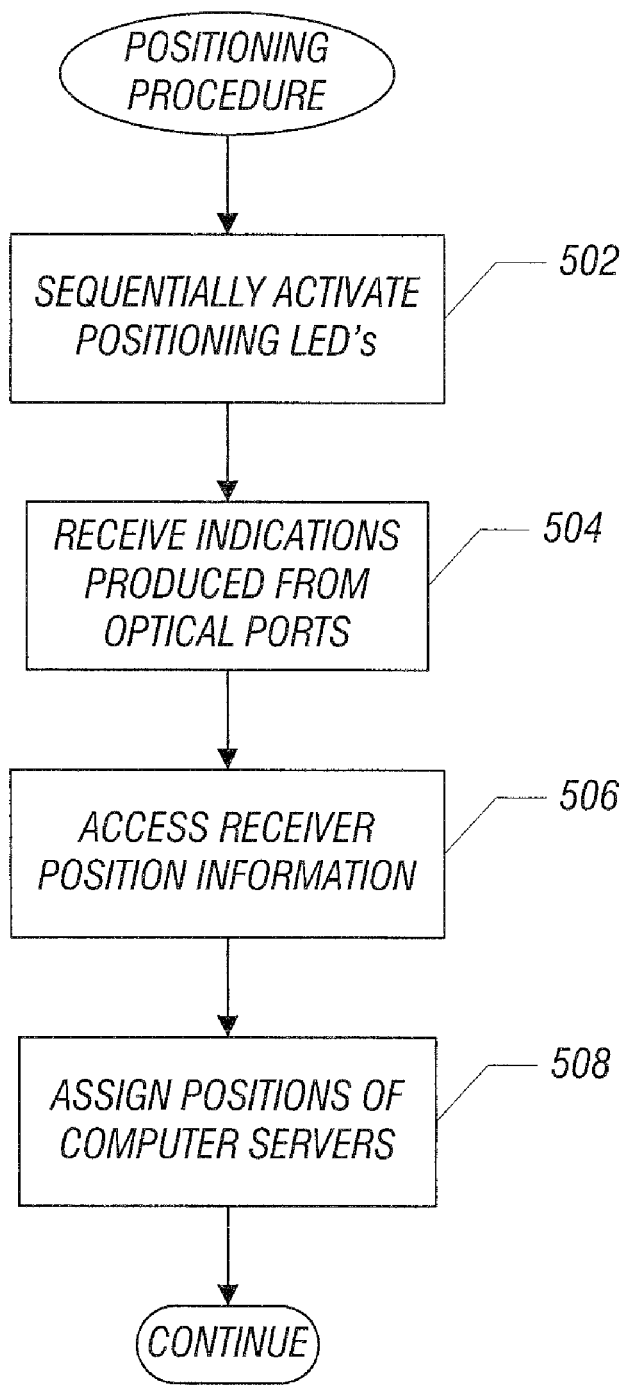
FIG. 5 is a flow diagram of a positioning procedure according to an embodiment.

A positioning procedure according to some embodiments as performed by the positioning software 118 of the positioning controller 104 (FIG. 1) is depicted in FIG. 5. The positioning procedure sequentially activates (at 502) positioning LEDs of computer servers 102 whose positions are to be determined. Note that the positioning procedure does not have to position all computer servers mounted within a rack in each positioning procedure, since the positions of most of the computer servers in the rack may already be known from previous positioning procedures. Thus, the positioning procedure would have to determine positions of just newly-added computer servers, which can be indicated by management processors 116 of such computer servers 102 providing some type of an indication that the respective computer servers 102 have been recently mounted into the rack.

In response to the sequential activation of the positioning LEDs of the computer servers 102 whose positions are to be determined, the positioning software 118 receives (at 504) indications produced from the optical ports that are adjacent the computer servers 102 whose positions are to be determined. The indications are sent from the optical sensor 106 (FIG. 1) to the positioning controller 104.

The positioning software 118 accesses (at 506) the receiver position information (115) stored in the storage 114 of the positioning controller 104 to determine the positions (which can be expressed as Us) of the respective optical ports from which indications have been received. Based on the accessed receiver positions, the positioning software 118 is able to assign (at 508) the corresponding positions of the computer servers (to be the same as the determined optical port positions).

In alternative embodiments, a computer server can initiate the positioning procedure by sending an event over the management network to the positioning controller 104, which causes the positioning controller 104 to instruct the computer server to illuminate its positioning LED 112. Alternatively, the computer server can illuminate its positioning LED without waiting for an instruction from the positioning controller 104.

A new computer server can be set to an "unknown location" state when power is first available. While in this state, the computer server can illuminate its positioning LED periodically (beacon) to cause the optical sensor 106 to send an event to the positioning controller 104. Note that this could happen before the new computer server is attached to the management network 126. When the new computer server location is determined, the positioning controller 104 can inform the new computer server's management processor 116 to change its location state and stop transmitting the beacon. Use of the beacon allows the positioning controller 104 to be informed that unidentified servers (or other devices) have been placed in the rack.

Instructions of the software described above (including positioning software 118 of FIG. 1) are loaded for execution on a processor (such as one or more CPUs 120 in FIG. 1). The processor includes microprocessors, microcontrollers, processor modules or subsystems (including one or more microprocessors or microcontrollers), or other control or computing devices. As used here, a "processor" can refer to a single component or to plural components (e.g., one CPU or multiple CPUs).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of positioning electronic devices in a rack, comprising:
    emitting, from a first one of the electronic devices in the rack, a first optical signal, where each of the electronic devices is selected from the group consisting of a computer, a data storage device, and a communications device;
    receiving, by a first one of a plurality of optical receivers mounted to the rack, the first optical signal from the first electronic device;
    propagating light from the first optical signal through one or more parallel light channels associated with the plurality of optical receivers, the propagated light from the first optical signal specifying that the first optical receiver has received the first optical signal; and
    determining, based on the propagated light from the first optical signal, a position of the first electronic device.

2. The method of claim 1, wherein determining the position of the first electronic device based on the propagated light from first light signal further comprises accessing information regarding respective positions of the plurality of optical receivers.

3. The method of claim 1, wherein emitting the first optical signal comprises emitting a beacon from the first electronic device to indicate that a location of the first electronic device is unknown.

4. The method of claim 1, further comprising:
    emitting, from a second one of the electronic devices in the rack, a second optical signal;
    receiving, by a second one of the plurality of optical receivers, the second optical signal from the second electronic device;
    propagating light from the second optical signal through the one or more parallel light channels, the propagated light from the second optical signal specifying that the second optical receiver has received the second optical signal; and
    determining, based on the propagated light from the second optical signal, a position of the second electronic device.

5. A method of positioning electronic devices in a rack comprising:
    emitting, from a first one of the electronic devices in the rack, a first optical signal, and from a second one of the electronic devices in the rack, a second optical signal;
    receiving, by a first one of a plurality of optical receivers mounted to the rack, the first optical signal from the first electronic device, and by a second one of the plurality of optical receivers, the second optical signal from the second electronic device;
    blocking a portion of the first optical signal and the second optical signal and carrying an unblocked portion of the first optical signal and the second optical signal through parallel light channels that are associated with the plurality of optical receivers, a pattern of blocked and unblocked portions of the first optical signal different from a pattern of blocked and unblocked portions of the second optical signal;
    determining, based on the pattern of blocked and unblocked portions of the first optical signal, a position of the first electronic device, and based on the pattern of the blocked and unblocked portions of the second optical signal, a position of the second electronic device; and
    controlling activation of respective light sources providing the respective first and second optical signals such that just one of the first and second optical signals are active at one time.

6. The method of claim 5, wherein controlling activation of the light sources comprises controlling activation of light-emitting diodes (LEDs) in the respective first and second electronic devices.

7. The method of claim 5, wherein the light sources are provided in the respective first and second electronic devices, wherein each of the first and second electronic devices includes a corresponding management processor, and wherein controlling activation of the light sources comprises sending control commands to the management processors in the respective first and second electronic devices.

8. The method of claim 5, wherein controlling activation of the light sources is performed by a management system, the method further comprising:
    the management system determining positions of the first and second electronic devices based on the pattern of blocked and unblocked portions of the first optical signal and the pattern of blocked and unblocked portions of the second optical signal.

9. A positioning apparatus for positioning removably mounted electronic devices in a rack, comprising:
    an opaque structure attached to the rack, the opaque structure configured to form at least two separate optical channels, wherein each of the at least two separate optical channels continuously extends along a same length of the rack;
    a plurality of optical receivers disposed in the opaque structure, the optical receivers to receive respective optical signals from light sources coupled to corresponding electronic devices, each electronic device removably mounted in the rack and selected from the group consisting of a computer, a data storage device, and a communications device; and
    a controller to receive indications from respective ones of the plurality of optical receivers for determining positions of the respective electronic devices.

10. The positioning apparatus of claim 9, wherein the controller is to sequentially activate the light sources coupled to the corresponding electronic devices during a positioning procedure to determine positions of the electronic devices.

11. The positioning apparatus of claim 9, wherein the plurality of optical receivers comprise a plurality of optical ports provided in the opaque structure.

12. The positioning apparatus of claim 11, wherein each of the optical ports comprises at least one opening in the opaque structure to expose a respective optical channel, wherein each optical port has a unique combination of openings and no openings in the opaque structure.

13. The positioning apparatus of claim 11, wherein each of the optical ports comprises plural N openings in the opaque structure, wherein N>1, and wherein the controller is configured to detect an error condition in response to detecting light from more than N openings.

14. A rack comprising:
a plurality of electronic devices, wherein each of the plurality of electronic devices has a respective light source associated therewith and is selected from the group consisting of a computer, a data storage device, and a communications device;
a plurality of optical receivers disposed in an opaque structure that is attached to the rack and that defines plural elongated light channels, the plurality of optical receivers to receive optical signals from the corresponding light sources and the plural elongated light channels to carry received optical signals; and
a sensor optically connected to the plural elongated light channels, the sensor to send data responsive to the received optical signals to a controller to enable the controller to determine positions of the plurality of electronic devices.

15. The rack of claim 14,
wherein the plurality of optical receivers comprise corresponding ports in the opaque structure, wherein each port comprises a combination of openings and no openings in the opaque structure indicative of that port and
wherein the sensor is to receive indications from the optical receivers via the plural elongated light channels.

16. The rack of claim 14 wherein the controller is to control activation of each light source such that just one of the light sources is active at a time.

17. The positioning apparatus of claim 10 wherein the controller is to sequentially activate the light sources in the corresponding electronic devices such that just one of the light sources is on at any given time.

18. The method of claim 1 further comprising avoiding collision between the first optical signal and another optical signal emitted from another of the electronic devices in the rack by controlling activation of the respective light sources providing the respective first optical signal and other optical signal such that just one of the first other optical signals are active at one time.

* * * * *